Feb. 26, 1935.     C. E. ELLIOTT     1,992,654
EGG BEATER
Filed May 2, 1931
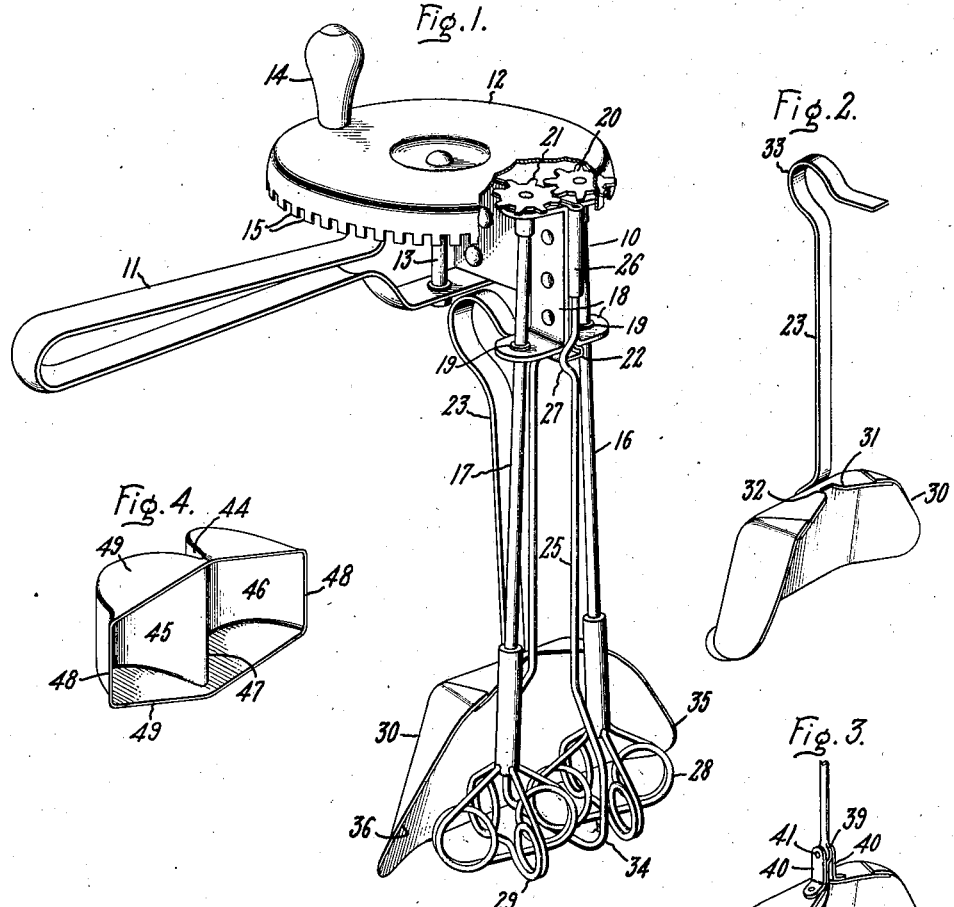
Inventor:
Clarence E. Elliott,
by Edward Williams,
His Attorney.

Patented Feb. 26, 1935

1,992,654

UNITED STATES PATENT OFFICE 1,992,654

EGG BEATER

Clarence E. Elliott, Kansas City, Kans.

Application May 2, 1931, Serial No. 534,615

16 Claims. (Cl. 259—131)

My invention relates to mixers and more particularly to a manually operated mixer of the egg beater type.

An object of my invention is the provision of a more efficient mixer by controlling the motion of the material to aid in the mixing.

Another object of my invention is the provision of a mixer supported so that the movement of the mixer frame caused by the rapid rotation of the driving wheel has no tendency to dislodge the mixer from its mixing position.

A further object of my invention is to provide more efficient beater elements.

Another object of my invention is to provide a mixer which is particularly adapted for use in shallow dishes such as soup bowls or frying pans and which will not throw the material being mixed from the container.

Yet another object of my invention is to provide a mixer which is adapted to be operated in a substantially horizontal position.

Another object of my invention is the provision of a deflector which is arranged so that it may be moved to a position where it may be easily cleaned.

Another object of my invention is to provide a beater in which the beater elements are biased against the container throughout the operation.

A still further object of my invention is to provide a mixer which may readily be moved about the container during the mixing operation.

Further objects and advantages of my invention will become apparent as the description proceeds.

In the past practically all mixers commonly called egg beaters have been designed with blades fixed on vertically rotating shafts supported from a frame. The top part of the frame formed a handle upon which considerable pressure was brought to bear to hold firmly the egg beater in its vertical position. The pressure was transmitted directly to the container by a member which carried pivots at its lower end about which the blades rotated. When the manually operated gear was driven rapidly the pull on the gear tended to move the lower end of the mixer out of its beating position. If the mixer end moved so that the vertical axis of the beater was at an angle, then the pressure on the handle caused a greater inclination, the blades striking the container and interrupting the mixing operation. To overcome this problem the prior art discloses outwardly extending feet, and wire networks so as to provide several points to transmit the vertical pressure to the disk. But such additional members make the cleaning of the mixer more difficult and in general impair the utility of the mixer.

In accordance with my invention these difficulties are overcome by the provision of mixers supported so that the beater elements, hereinafter called beaters, are biased against the container throughout the mixing operation. By my design the force of gravity biases the beaters against the container and the driving gear is arranged so that the turning torque adds to the force of gravity increasing the stability of the mixer in operation. No physical effort is expended in pressing the mixer in firm engagement with the container thus decreasing substantially the work required in whipping eggs, beating cream and the like.

These advantages are obtained and the objects of my invention are realized by providing relatively small beaters carried by and rotatably driven by shafts supported in a frame carrying the driving mechanism. These shafts during the mixing operation are substantially horizontal in contrast to the vertical position. A guard extends from the frame below the beaters to keep the beaters from striking the container and through which the biasing forces are transmitted to the container. The beaters are rotated in a direction such that the material being mixed is driven by each beater toward the other beater. At the intersection of the beaters both beaters drive the material upwardly, preferably in a stream which rises above the level of the material being mixed. The direction of this stream is then redirected downwardly by a deflector plate toward the material being mixed. The reentering material carries considerable air with it thus aerating the mixture. The deflector plate also prevents splattering of the material.

I prefer to mount the manually rotated driving gear on the upper end of the frame with its axis parallel to the beater shafts. A handle extends to one side of the driving gear parallel to the plane of the gear which is grasped with one hand to support the mixer, the guard serving as a fulcrum about which the mixer pivots. The dimensions of the mixer are such that with the handle in this position, the force of gravity tends to turn the beater shafts about an axis through the handle thereby biasing the beaters against the container. The torque exerted on the driving gear also results in a biasing force which adds to the force of gravity. By this means, the beaters are subject to a positive biasing force throughout the operation. I consider this feature an important part of my invention. It is particularly advantageous when the mixer is used in a large frying pan to aerate and beat out the lumps in gravies and the like and because of this construction of my mixer it may be readily moved about the container while rapidly rotating the beaters.

For a more detailed description of my invention reference should now be had to the drawing in which Fig. 1 shows a perspective view of my improved mixer in a vertical position. Fig. 2 shows a perspective view of the deflector plate and its support. Fig. 3 shows a perspective view of a modification of the mounting means for the deflector plate. Fig. 4 shows a modification of a deflector which may be used. Fig. 5 shows an exploded view for the assembly of the beater elements on the shaft. Fig. 6 shows an exploded view of a different way of fastening the beaters for assembly on the shaft and Fig. 7 shows the parts in Fig. 6 in their assembled positions. Fig. 8 shows an improved form of the beater element.

In Fig. 1 I have illustrated a frame 10, to which is attached a handle 11 in which is rotatably mounted a crown gear 12 by means of shaft 13. A knob 14 is provided on the crown gear 12 for the rotation thereof. The frame rotatably supports shafts 16 and 17 by means of the U-shaped members 18. Small bushings 19 are provided in the U-shaped members to insure minimum friction for the shafts 16 and 17. Nesting well within the crown gear 12 and secured to the ends of shafts 16 and 17 in intermeshing relation, are gears 20 and 21. The gear 20 is driven from the crown gear 12 which in turn drives gear 21. There is also provided on the frame a rectangular shaped channel member 22 into which the end of the deflector plate support 23 may be inserted. There is also provided supports 26 for the guard member 25. Depressions are formed in the guard member 25, as at 27, so that the entrance of the deflector supporting member 23 into the channel 22 will not be interfered with. To the ends of the shafts 16 and 17 are rigidly secured beaters 28 and 29. The deflector 30 is supported over the beater elements 28 and 29 by the supporting member 23 in the manner already described. It will be noticed that the deflector is formed so as to nest over the beaters. By nesting over the beaters I mean that the deflector shall be so spaced from the beaters that it will cooperate in the mixing or beating operations. The deflector as thus arranged performs the dual function of improving the mixing of the materials and of acting as an effective splash guard. A cut away portion 31 (Fig. 2) enables the deflector to fit fairly close to the beaters, the notch 32 engaging the guard member 25 for mutually bracing purposes. In supporting member 23 a gooseneck 33 is formed so that a finger may be placed therein to facilitate the removal of the deflector. This portion of the supporting member is preferably resilient so as to bias the deflector 30 against the guard 25.

In operating my mixer the material to be mixed is preferably placed in a dish with relatively low side walls. The handle 11 is grasped with the left hand and the beater is supported substantially in a horizontal position, the portion of the guard 25 indicated at 34 resting on the bottom of the dish. The handle 14 is then turned in a clockwise direction. It will be noticed that the beaters 28 and 29 rotate so that the lobes of both beaters move upwardly in intermeshing relation toward the deflector plate carrying upwardly the material being mixed. As the material thus carried upwardly impinges against the deflector plate 30, it is redirected into the container in oblique streams along the portions indicated at 35 and 36. The travel of the material being mixed in the fashion just described and the jet-like streams of fluid returning to the container carries into the material being mixed a considerable amount of air, which is an essential requirement for the whipping of cream or of the whites of eggs, as well as other materials. The deflector also prevents splattering of the material being mixed.

It is to be further observed that the beaters pull the material from the walls of the container and thence upwardly through their intermeshed portions. This action is so accentuated that the moving material forms a regular cone with the apex near the deflector plate 30. By controlling the flow of the material being mixed I have found that with my improved mixer the time required for beating eggs or whipping cream is substantially diminished and the effort required for the mixing operation is much less than that required by the ordinary type of egg beater.

The handle 11 extends from frame 10 so as to just clear the gear teeth 15 of driving gear 12. By locating the handle near the driving gear, oscillation forces due to the forces exerted on knob 14 of the driving gear are easily resisted. Furthermore the placing of the handle of the mixer in a position remote from the beaters makes effective the weight of the beater end of the mixer in biasing the beaters on guard 25 against the container along the portion of guard 25 designated at 34. The torque required in turning the driving gear gives rise to a force tending to turn the beater as a whole clockwise about an axis through the handle and parallel to beater shafts. This force adds to the biasing force of gravity. Of course since the beater is manually operated, this force is not constant in magnitude due to variations in driving pressure, but it is always exerted in the same direction. Hence it will be seen that my mixer is far more stable than prior mixers and the effort required to hold the mixer in the operative position is greatly diminished.

If a left-handed person desires to use the mixer, it is to be noted that the only change necessary is to remove the deflector 30 and re-insert the deflector support 23 in the other end of the channel 22 and the handle 11 may then be grasped in the right hand, the knob 14 then being turned in a counter-clockwise direction and the beaters 28 and 29 carrying the material upwardly as before during the mixing operation.

In Fig. 3 I have shown a modification of the mounting of the deflector 30. A flattened portion 39 is provided in the guard member 25 and two right angle members 40 secured to the deflector at one end are pivotally connected at the other to the flattened portion 39 of the guard member by a pintle 41. A spring clip 42 carried by the deflector secures the deflector in place by clamping over the end of the guard member at the portion of the deflector indicated near 43 and a like clip may be mounted on the opposite side for locking the deflector in a raised position when the mixer is used in a vertical position.

In Fig. 4 I have shown a modification of the deflector and in this modification it will be noticed that a deflector is formed so as to have two curved portions 45 and 46 extending from 47 upwardly away from the guard 25. It will also be noticed that the ends of the deflector are much narrower than the center portion 47. This construction gives a stream-line flow to the material that is carried upwardly by the beater elements and narrows the stream down to augment the jet-like character of the material returned to the container. While end walls 49 have been illustrated in Fig. 4, it is obvious that the lower end wall may be omitted if desired.

In Fig. 5 I have shown an exploded view of the mounting for the beaters 28 and 29, illustrated in Fig. 1. This mounting comprises a tubular member 50 with teeth 51 formed at the lower end. It will be noticed that the beater is formed from a wire member 52, from a fairly stiff wire, a depression 53 being formed in the end thereof. The ends 55 and 56 of the beater 52 are then placed within the tubular member and the beater element 54 is placed over the beater 52 the ends similarly entering tube 50. The teeth 51 serve to rigidly secure the beater elements in place and to close the ends of the tube 50. The completed 4-lobed beater is then placed on the shaft and may be secured by any suitable means such as by welding or by stamping thereon. Each lobe of a beater has approximately one and one-half turns of wire. In the drawing the turns are shown pressed together but I prefer to wind the lobes so that the turns of each lobe are spaced apart one from the other. This facilitates cleaning and increases the efficiency of the beaters. In practice I have noticed that in beating the white of an egg it sometimes tends to climb, or to move upwardly along the shaft. This may be obviated by bending each lobe so that when viewed in its normal horizontal operating position the plane of each lobe as it comes into the intermeshing position is inclined toward the container, or in other words forming an acute angle with a line parallel to the beater shafts. Giving the beater lobes this inclination diminishes the tendency of the material to climb and concentrates the flow of material against deflector 30 nearer its open end. A beater element in accordance with this description is shown in Fig. 8 in which the inclination of the lobe between points 64 and 65 is clearly shown. This beater element also shows the spaced turns referred to above.

A more preferred form of fastening is illustrated in Fig. 6. The two elements of the beater illustrated in Fig. 5 are assembled as before and the ends 55 and 56 rest within the grooves 58 and 59 provided in member 57 while the corresponding ends of the member 54 rest within the grooves 60 and 61. Member 62 is then telescoped within member 57 and wedges in its grooves 63 the ends of the beater elements. The wedge member 62 is then soldered or brazed so as to give a rigid fastening for the beater elements and to seal the same to facilitate cleaning. The assembled structure is shown at Fig. 7 wherein the member 57 is shown keyed to a beater shaft with the head of the shaft riveted somewhat to more securely hold the wedging member 62 in place.

Having thus described my invention, I claim and desire to secure by Letters Patent:

1. A mixer having two beaters, supporting means therefor, a guard for supporting said beaters in a horizontal position, means for driving said beaters to carry the material upwardly beween the beater elements, and a deflector arranged to return the material carried upwardly so as to aerate the material being mixed.

2. A mixer, including a frame, two beater carrying shafts rotatably supported in said frame, a guard therefor carried by said frame and extending over the top and about the ends and beneath said beaters and back to the frame so that said beaters may be operated in a substantially horizontal position and a deflector nesting over said beaters when said beaters are in a substantially horizontal position, and means on said frame for removably supporting said deflector.

3. A mixer, including a frame, beater carrying shafts rotatably supported in said frame, a deflector nesting over said beaters, an arm carrying said deflector at one end, means on said frame detachably supporting said deflector carrying arm, the latter having an upturned portion to facilitate its removal from said frame.

4. In a mixer adapted for operation in a substantially horizontal position the combination of beaters while in said substantially horizontal position, a deflector nesting over said beaters while in said substantially horizontal position, and means for swinging said deflector into operative position over the top of said horizontally positioned beaters and out of operative position.

5. In a mixer, the combination of a frame, rotatable beater carrying shafts carried by said frame, a guard for said beaters, and a deflector mounted on an arm secured to said frame, the arm having an upturned resilient portion to bias said deflector against said guard.

6. In a mixer adapted for operation in a substantially horizontal position, the combination of beaters, a guard for said beaters, a deflector nesting over said beaters while in said position and hinged means on said guard for supporting said deflector.

7. In a mixer, the combination of a frame, beater elements mounted on rotatable shafts carried by said frame, a guard supported by said frame between the beater shafts, and a deflector member mounted above said beaters, the said deflector being open at the lower portion and curved over said beaters on the upper and side portions thereof.

8. In a mixer, the combination of a frame, rotatable beater carrying shafts adapted for rotation about a horizontal axis carried by said frame, a guard for said beaters, and a curved deflector mounted from said frame nesting over said beaters when in a horizontal position, the said deflector being open at the end opposite the frame.

9. A mixer, a beater element therefor mounted on a driving shaft by means of a hollow tube with fingers formed at the ends thereof, the shank of the beater element fitting in telescopic relation within the tube the said fingers being bent over the shank to hold the beaters in place and to close the end of the tube.

10. In a mixer, the combination of two beater elements adapted for rotation about a horizontal axis, shafts therefor, meshing gears on said shafts, a manually operable cup shaped gear, means for supporting said cup-shaped gear so that its axis is substantially parallel to the axes of said shafts, said meshing gears nesting within said cup shaped gear, one of said meshing gears being in operative engagement with said cup shaped gear.

11. A mixer for liquid and the like, a supporting frame, a pair of beaters, beater supporting and driving shafts carried by said frames, means spaced from said beaters for acting as a fulcrum for the support of said beaters in a substantially horizontal position, means for driving the beaters in directions to carry liquid upwardly between them, and deflector means supported from said frame and nesting over said beaters for directing the liquid downwardly to aerate the liquid being mixed.

12. A mixer including a pair of beater elements each of which comprises four spaced radial lobes formed of wire, each lobe including more than a single turn of said wire, said turns of each of said lobes being spaced apart one from the other, and means supporting said beater elements for rotation so that said lobes of one beater element intermesh with the lobes of the other beater elements.

13. A mixer for liquid food materials consisting of a pair of beater elements formed of wire, each of said elements being provided with a plurality of spaced radial lobes, a pair of driving shafts for rotating said beater elements in intermeshing relation, means for preventing the creepage of said material along said shafts comprising said radial lobes each of which is bent to form an acute angle with respect to the axis of said driving shafts.

14. A mixer for liquid food materials including intermeshing beaters, driving means for rotating said beaters, means for supporting said beaters so that said driving means rotates said beaters in a direction to drive the food material upwardly above the normal level thereof, a deflector, means supporting said deflector adjacent said beaters and in the path of said upwardly driven material so that said deflector redirects said upwardly driven material downwardly in oblique streams to aerate the material being mixed.

15. A mixer adapted to be used in a substantially horizontal position including a frame, beater shafts mounted in said frame for rotation in a substantially horizontal plane when in operative position, a guard for supporting said beaters while in said operative position, a driving gear for said beater shafts, means mounting said driving gear with its axis of rotation substantially parallel with the axis of rotation of said beater shafts, a handle adjacent to said driving gear and extending from said frame to said beater shafts and to one side thereof at right angles whereby when said handle supports the beater shafts in a substantially horizontal position said shafts are biased downwardly by the force of gravity and the driving torque of said driving gear produces a force acting downwardly on said beater shafts said forces assisting in holding said mixer against said guard.

16. A mixer for liquid and the like, a supporting frame, beater supporting and driving shafts carried by said frame, means for supporting said frame and shafts in a substantially horizontal position, means for driving the beaters in directions to carry liquid upwardly between them, and deflector means supported from said frame and nesting over said beaters for directing the liquid downwardly to aerate the liquid being mixed.

CLARENCE E. ELLIOTT.